United States Patent [19]

Baptist et al.

[11] Patent Number: 5,465,392
[45] Date of Patent: Nov. 7, 1995

[54] APPARATUS AND METHOD FOR OPERATING A WIRELESS LOCAL AREA NETWORK HAVING POWER CONSERVATION

[75] Inventors: Robert Baptist, Populierstraat; Theodoor A. Kleijne, Engelberg; Leo Monteban, Schildpadweide; Marc Meertens, Schonenburgseind, all of Netherlands

[73] Assignee: AT&T Global Information Solutions Company, Dayton, Ohio

[21] Appl. No.: 245,128

[22] Filed: May 17, 1994

[30]         Foreign Application Priority Data

Oct. 20, 1993 [GB] England .................................. 9321657

[51] Int. Cl.⁶ ................................ H04B 7/26; H04Q 7/20
[52] U.S. Cl. ........................ 455/38.3; 455/54.2; 455/70; 455/343
[58] Field of Search ................................ 455/38.2, 38.3, 455/54.1, 54.2, 58.2, 69, 70, 343; 370/85.1, 95.1

[56]                 References Cited

U.S. PATENT DOCUMENTS 5,241,542   8/1993   Natarajan et al. ................. 455/38.3 X
5,276,680   1/1994   Messenger ......................... 455/38.3 X

FOREIGN PATENT DOCUMENTS

0529269   3/1993   European Pat. Off. .......... G06F 1/32
9010987   9/1990   WIPO .
9219059  10/1992   WIPO ........................... H04L 12/56

Primary Examiner—Chi H. Pham
Attorney, Agent, or Firm—Paul J. Maginot

[57]                     ABSTRACT

In a wireless local area network system including a server and a plurality of mobile wireless stations, the server maintains a table of stations active in the network system and monitors the transmission activity of the stations. If no activity is detected from a station for a predetermined time, a series of watchdog messages is sent requesting a response from that station. The stations are battery powered and operate in an "AWAKE" state to receive or transmit messages or in a SLEEP state of low power consumption. The stations return from the SLEEP state to the AWAKE state in time to receive at least one watchdog message, thereby avoiding the stations being undesirably logged out from the table of active stations.

14 Claims, 6 Drawing Sheets

APPARATUS AND METHOD FOR OPERATING A WIRELESS LOCAL AREA NETWORK HAVING POWER CONSERVATION

BACKGROUND OF THE INVENTION

This invention relates to wireless local area network systems.

A recent development in the field of local area networks has been the introduction of wireless communications in such networks. Another development has been the introduction of portable, battery-operated devices for use in such networks. Unfortunately, the batteries used for such devices have a restricted life span, thereby limiting the time for which the portable devices can be effectively operated.

In order to control the operation of local area networks there have been introduced network operating systems (NOS). A feature of many such NOS systems is that a record or log of all active stations in the network is maintained at a central control device such as server. If a station does not show activity for a certain period, a procedure is followed to determine if the station is still active. If the station is no longer active, then it is deleted from the table, or "logged-out", whereby resources such as files which were opened for use by that station can be closed off.

It is an object of the present invention to provide a method for operating a local area network system which enables the battery power of mobile stations to be conserved, while having the capability of preventing the stations from being undesirably logged out of a network operating system.

SUMMARY OF THE INVENTION

According to one aspect of the present invention, there is provided a method of operating a wireless local area network system, including a server and a plurality of mobile stations, characterized by the steps of: monitoring at the server the transmission activity of the mobile stations; if no transmission activity of a mobile station is detected for a first predetermined time, transmitting to the mobile station at least one watchdog message requesting a response message from the mobile station; operating the mobile station at a relatively low power level for a time period commencing after transmission of a message by the station; and thereafter operating the mobile station at a relatively high power level prior to the transmission of the at least one watchdog message, thereby enabling the transmission by the mobile station of a response message to the at least one watchdog message.

According to another aspect of the present invention, there is provided a local area network system including a server and a plurality of mobile stations, characterized in that the server is adapted to monitor the transmission activity of the mobile stations and if no activity of a mobile station is detected for a first predetermined time, is further adapted to transmit at least one watchdog message requesting a response message from the mobile station; in that the mobile station includes a transceiver mechanism and a power management mechanism adapted to operate the transceiver mechanism at a relatively low power level for a time period commencing after transmission of a message by the station; in that the power management mechanism is adapted to operate the transceiver mechanism at a relatively high power level prior to the transmission of the at least one watchdog message; and in that the mobile station is adapted to cause the transceiver mechanism to transmit a response message to the at least one watchdog message, during operation of the transceiver mechanism at the relatively high power level.

BRIEF DESCRIPTION OF THE DRAWING

Embodiments of the present invention will now be described by way of example with reference to the accompanying drawings, in which.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
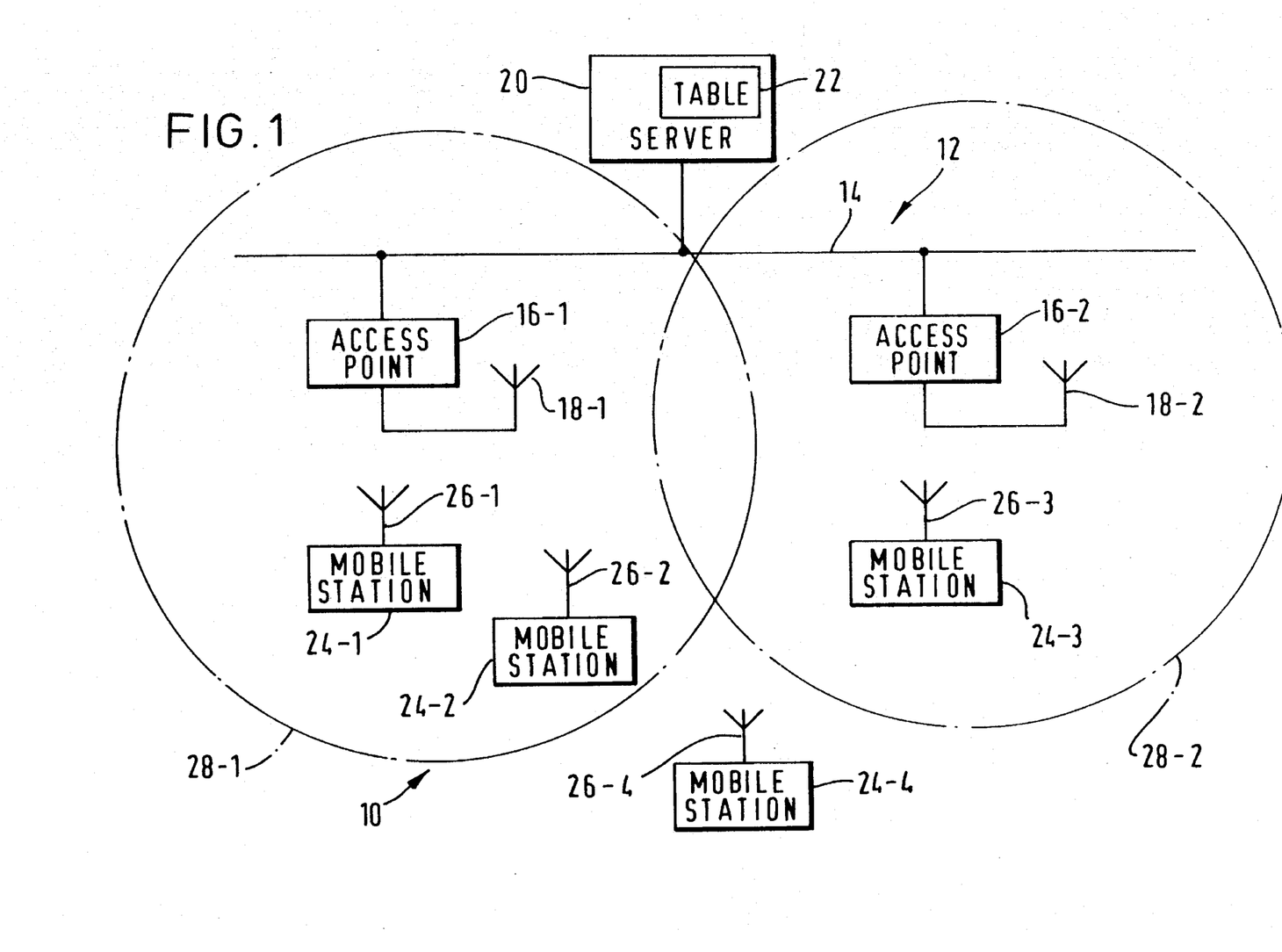
FIG. 1 shows a first embodiment of a local area network system including a plurality of mobile, battery-operated wireless stations.

Referring first to FIG. 1, there is shown a wireless communications system 10 including a backbone LAN (local area network) 12, which is a wired, cable-based LAN, and which includes a cable 14 connecting to a plurality of base stations referred to herein as access points 16, referenced individually as access points 16-1 and 16-2. The access points 16 have antennas 18, referenced individually as antennas 18-1 and 18-2. A server 20 is connected to the cable 14 to provide a server function for devices communicating with the LAN 12. The server 20 includes a storage mechanism including a table 22 which maintains a record of stations which are active in the LAN system 10, as will be more fully explained hereinafter.

Also included in the system are one or more mobile stations 24, referenced individually as 24-1 to 24-4. The mobile stations 24 have antennas 26, referenced individually as antennas 26-1 to 26-4. The access points 16 have overlapping coverage areas, referred to as cells 28, referenced individually as cells 28-1 and 28-2. Within the wireless coverage area formed by the combined cells 28-1 and 28-2, the mobile stations 24 can move around freely while staying in permanent logical connection with the backbone LAN 12 and server 20. A station which moves outside such combined area, such as the station 24-4 shown in FIG. 1, is said to be in a dead spot, such station being incapable of effective communication with the backbone LAN 12.

Figure 2:
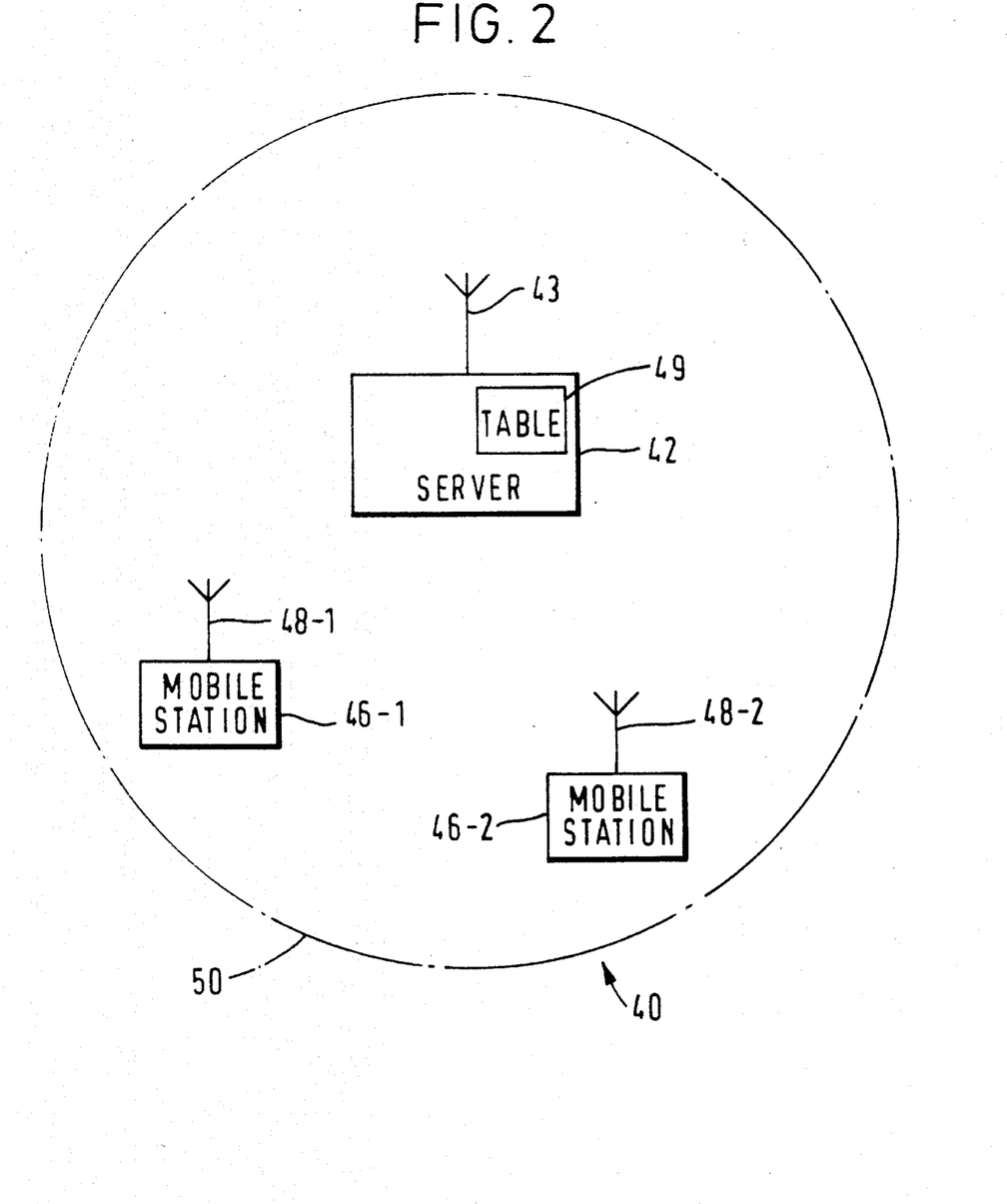
FIG. 2 shows a second embodiment of a local area network system including a plurality of mobile, battery-operated wireless stations.

The present invention is also applicable to a wireless LAN which does not have a cable-based backbone. Referring to FIG. 2, there is shown a system in the form of a LAN 40 which includes a server 42 having an antenna 43. The server 42 communicates over a wireless communication channel with mobile stations 46, referenced individually as stations 46-1 and 46-2. The mobile stations 46 have antennas 48, referenced individually as antennas 48-1 and 48-2. The server has a storage mechanism including a table 49 which maintains a record of stations 46 which are active in the LAN 40. The server 42 has a coverage area 50 within which wireless communication is possible with the mobile stations 46. Although the subsequent description is described with reference to the system shown in FIG. 1, it should be understood that such description is equally applicable to the system shown in FIG. 2.

Figure 3:
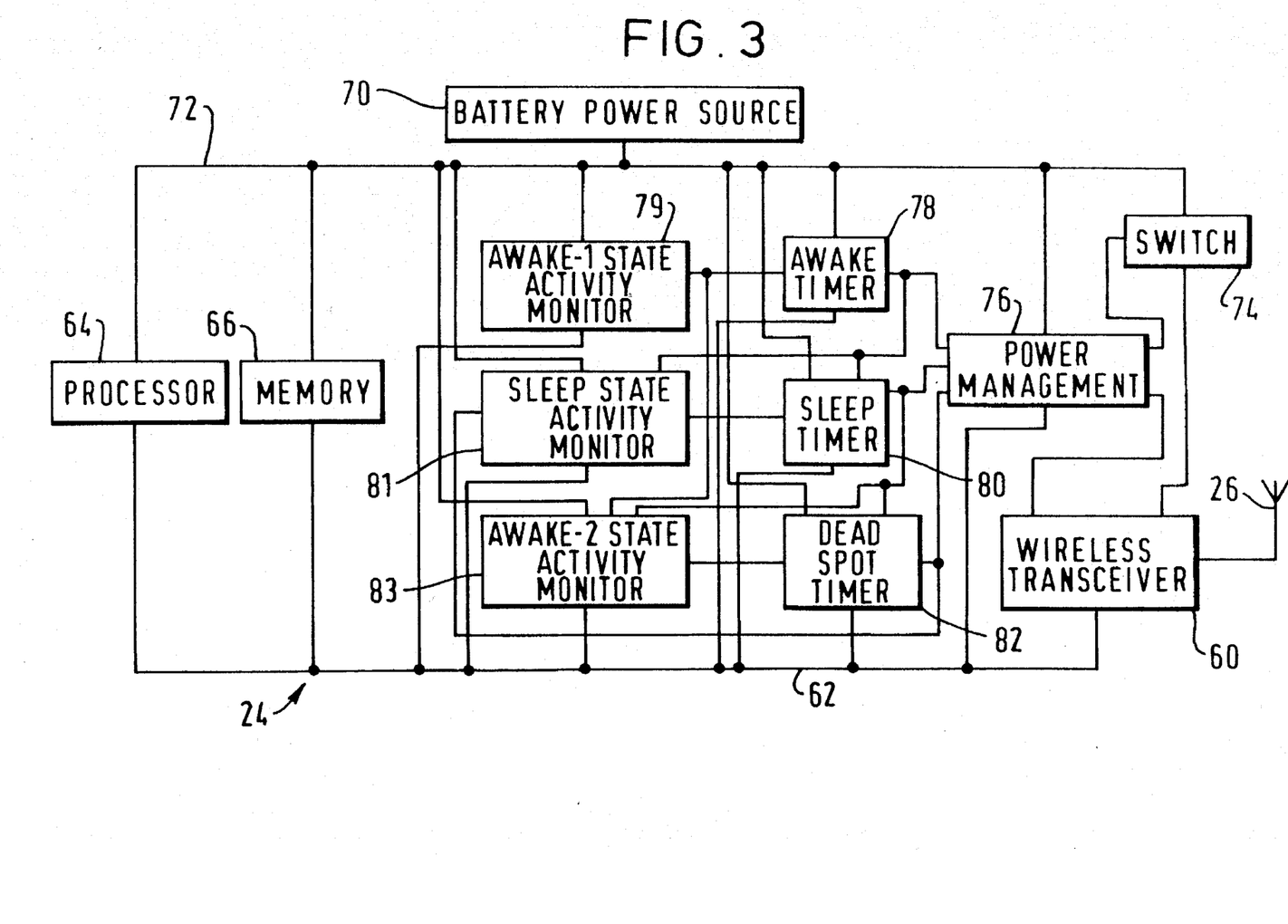
FIG. 3 is a simplified block diagram of a mobile, battery-operated wireless station.

Referring now to FIG. 3, there is shown a simplified block diagram of a mobile station 24 (FIG. 1), it being understood that a mobile station 46 (FIG. 2) is of identical construction. The mobile station 24 includes a wireless transceiver 60 coupled to the antenna 26 and to a bus 62. The mobile station 24 also includes, connected to the bus 62, a processor 64 for controlling the operation of the station 24, and memory 66 for program and data storage. Other devices such as a keyboard (not shown) and a display (not shown) may be connected to the bus 62 to enable the mobile station 24 to operate as a hand-held data processing device. The mobile station 24 is battery powered, and includes a battery power source 70 connected to a power line 72, which supplies power to the components of the mobile station 24. The power line 72 is connected to supply continuous power to the processor 64 and memory 66. However, power is supplied to the transceiver 60 via a switch 74 which operates under the control of a power management circuit 76. The mobile station 24 also includes an awake timer 78, a sleep timer 80 and a deadspot timer 82, which are connected to the power management circuit 76, and are responsive to the outputs of respective activity monitor circuits 79, 81 and 83. The function of the timers and activity monitors will be explained hereinafter.

Figure 4:
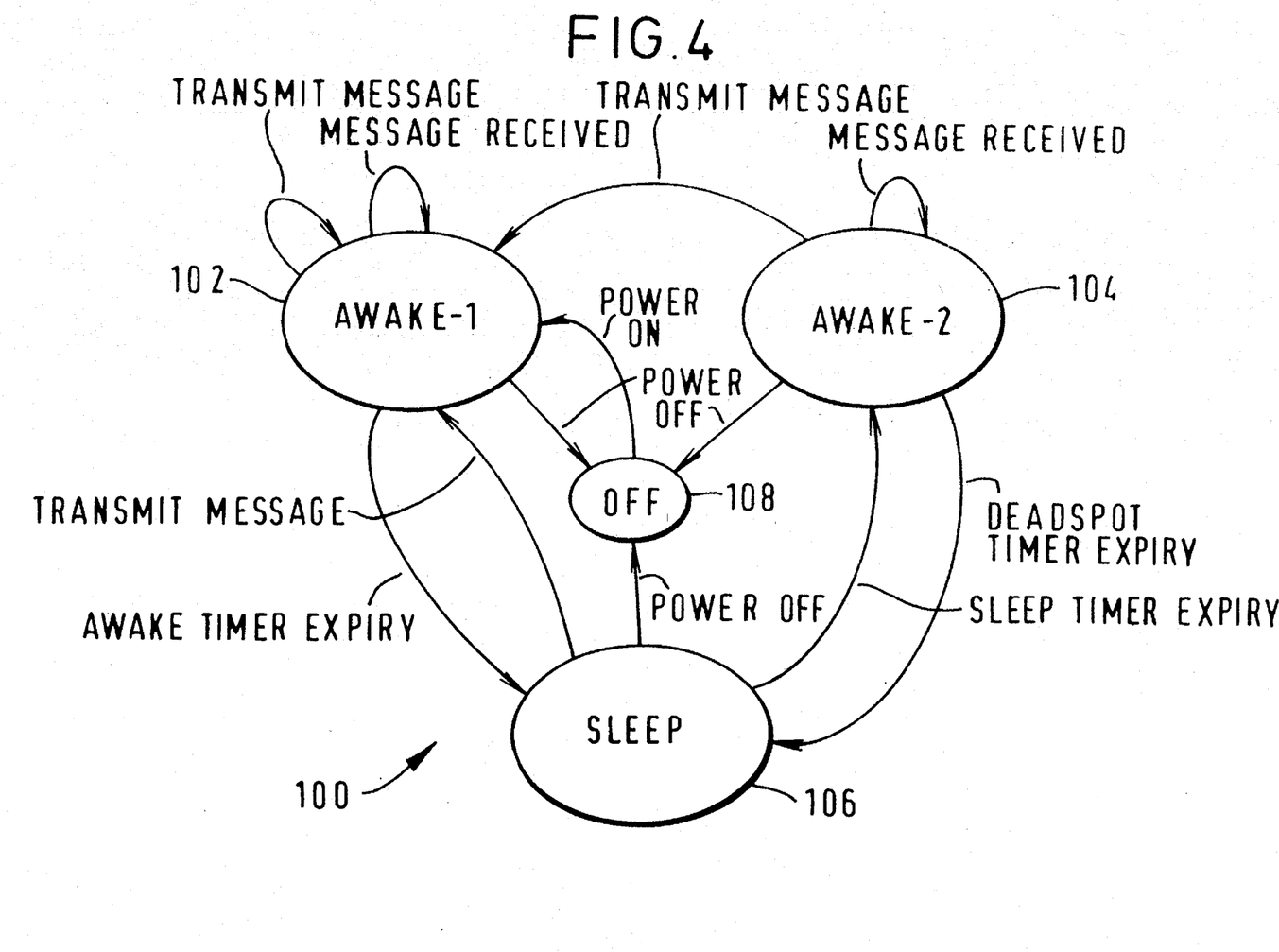
FIG. 4 is a state diagram helpful in understanding the operation of the mobile station shown in FIG. 3.
Figure 5A:
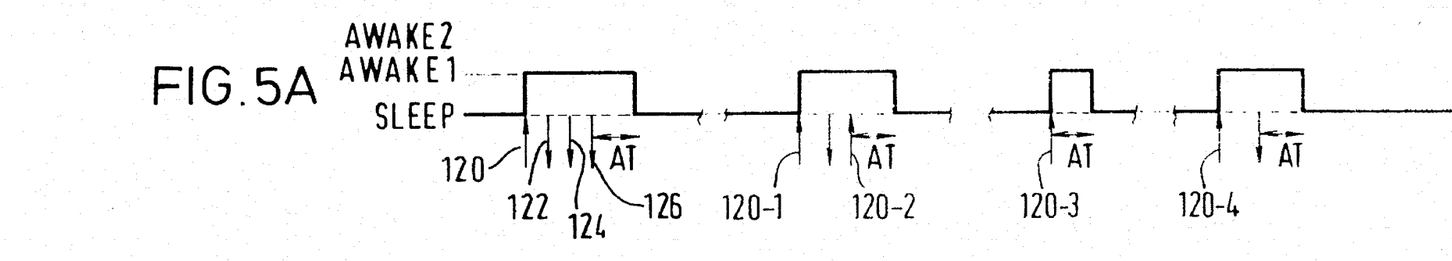
FIGS. 5A to 5C are timing diagrams illustrating the operation of the mobile station shown in FIG. 3.
Figure 5B:
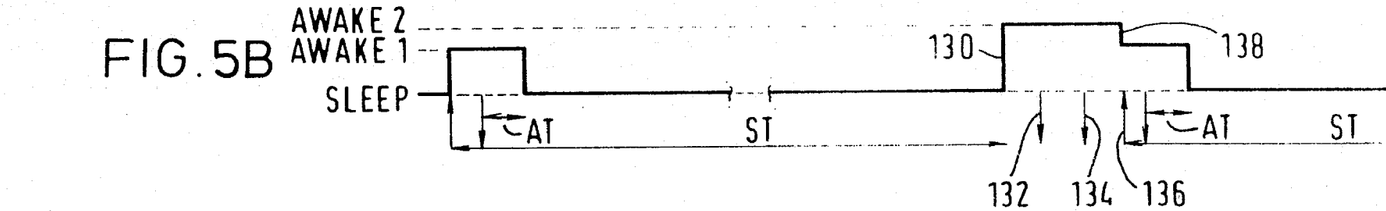
Figure 5C:
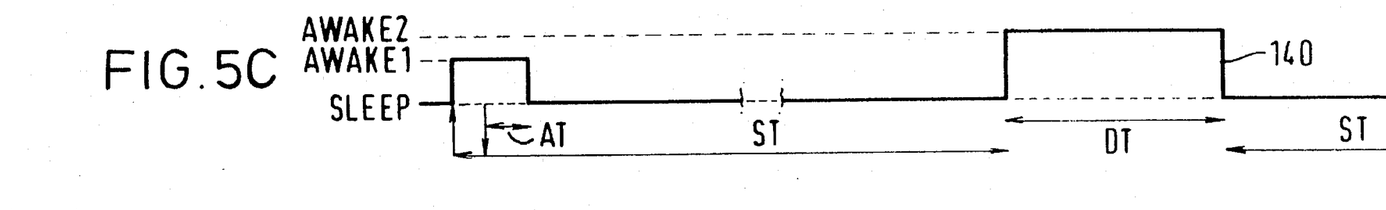

The operation of the power management circuit 76 will now be described with reference to the state diagram shown in FIG. 4, and the timing diagrams shown in FIGS. 5A to 5C. It should be understood that the power management circuit 76 controls the wireless transceiver 60 to be in an AWAKE state in which the transceiver is fully powered for the transmission and receipt of messages, or a SLEEP state in which only a small fraction of the full power is consumed and messages cannot be received or sent. Thus, battery power is conserved when the station is operating with the transceiver in the SLEEP state. Referring to FIG. 4, it is seen that the AWAKE state is formed by two distinct states, AWAKE-1 state 102 and AWAKE-2 state 104, in each of which the transceiver 60 is fully powered. There is a single SLEEP state 106 in which the transceiver 60 is incapable of transmitting or receiving messages. Finally there is an OFF state 108 in which power to the station is fully switched off.

The AWAKE-1 state 102 is entered initially, that is, when the station is first powered on, and is also entered each time a transmission from the station is to take place, regardless of which state the station was in. Whenever the AWAKE-1 state is entered, the awake timer 78 (FIG. 3) is started. The AWAKE-1 state activity monitor 79 monitors messages and resets the awake timer 78 each time a message is detected going to or from the station. The awake timer 78 will expire if, during a predetermined period, referred to as the AWAKE TIME (AT) period, no activity of the transceiver 60 is detected by the activity monitor 79. The awake timer has a duration sufficient to allow for a typically expected reply to arrive at the station following the transmission of a message by the station. Referring to FIG. 5A, the upwardly directed arrows such as the arrow 120 represent the transmission of a message from the mobile station and the downwardly directed arrows such as the arrow 122 represent the receipt of a message by the station. It is seen that following the transmission of a message (arrow 120) and the receipt of two messages (arrows 122 and 124), the awake timer 78 does not expire. However, following receipt of the message represented by the arrow 126, the awake timer does expire (time AT) and the SLEEP state is entered. Thus, as shown in FIG. 5A, the station alternates between SLEEP and AWAKE-1 states, triggered by requests to transmit, represented by the upwardly directed arrows 120 and 120-1 to 120-4.

It should also be understood that whenever the station 24 transmits a message, the sleep timer 80 is started (or restarted), either during the SLEEP state, or the AWAKE-1 state. When the sleep timer 80 expires, the AWAKE-2 state is entered. Referring to FIG. 5B, it is noted that when the SLEEP state is entered, following the expiry of the wake time (AT), the sleep timer 80 is already running and the station is inactive for the subsequent duration of the sleep time (ST). The sleep state activity monitor 81 (FIG. 3) will monitor the outgoing traffic to the transceiver 60 and, upon detecting an outgoing message, will cancel the sleep timer 80. The station will return to the AWAKE-1 state and the AWAKE-1 state activity monitor 79 will resume operation. Also, the AWAKE timer 78 will be started. However, upon expiration of the sleep timer 80, the AWAKE-2 state 104 (FIG. 4) is entered, as shown by the state transition 130. Note that when the station is in the AWAKE-2 state messages (such as broadcast messages, for example), may be received without a state change, as shown by the arrows 132, 134. However, if a message transmission is to take place as shown by arrows 136, the AWAKE-1 state is entered, as shown by state transition 138.

It should be noted that when the AWAKE-2 state is entered, the deadspot timer 82 is started. The operation of the deadspot timer 82 is not shown in FIG. 5B since the deadspot timer, which runs during the AWAKE-2 state does not expire because a message transmission (arrow 136) is effected prior to the deadspot expiry time causing the station to switch to the AWAKE-1 state. It will be appreciated that the AWAKE-2 state activity monitor 83 (FIG. 3) monitors the outgoing traffic to the transceiver 60 (ignoring any incoming traffic) and, upon activity detection, will cancel the deadspot timer 82 and return to the AWAKE-1 state activity monitor 79. As shown in FIG. 5C, however, the deadspot timer 82 does expire, after the deadspot time period (DT), and the station leaves the AWAKE-2 state and returns to the SLEEP state, as shown by the state transition 140. This prevents the continuous consumption of power if, for example, the mobile station 24 has moved out of reach of any access point 16 and is in a dead spot, as shown by the station 24-4 in FIG. 1. It will be appreciated that messages may be received in the deadspot time (DT) without changing from the AWAKE-2 state.

In a preferred embodiment, the awake time is typically of the order of seconds, the sleep time is typically of the order of minutes, with the deadspot time being considerably smaller than the sleep time.

Figure 6:
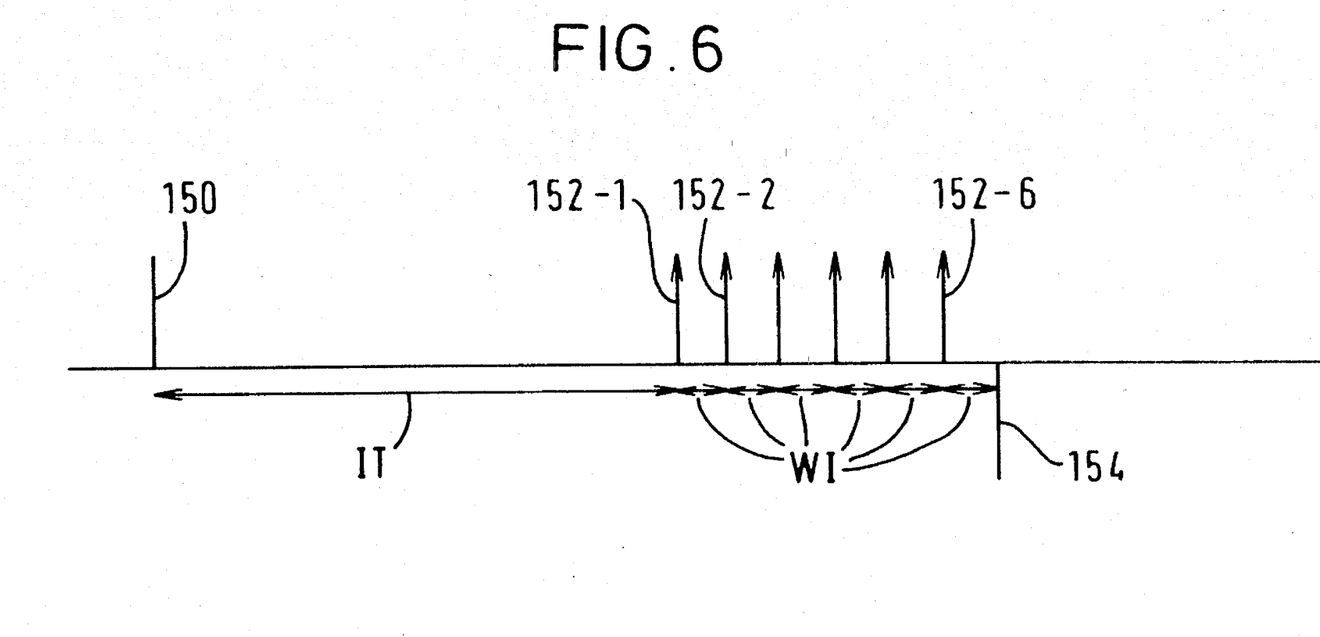
FIG. 6 is a timing diagram showing the operation of a function of the servers shown in FIGS. 1 and 2.

The server 20 (FIG. 1) embodies a network operating system (NOS) which maintains a record in the table 22 of stations which are active in the system. Stations which are active in the system are referred to as "logged-in" and stations which are inactive are referred to as "logged-out". In order to maintain the record of active stations, a watchdog function is provided whereby the NOS continuously monitors the communication activity of all logged-in stations in the system. Referring to the timing diagram of FIG. 6, the vertical line 150 represents the time at which transmission activity of a station 24 is detected as ceasing. Following such time, a station idle timer (not shown) is started at the server. If no activity of the station 24 is detected during a predetermined time, referred to as station-idle time (IT, FIG. 6) then the server transmits to the station a protocol message, referred to as a watchdog message 152-1 (FIG. 6) to ascertain whether the station is still active. If the station is still active, that is, the station is operative but had no transmission activity during the station idle time IT, then the station will respond with a response message and the watchdog function for that station is reset. If the station does not reply, then a series of further transmissions of the watchdog message is effected, as shown by the arrows 152-2 to 152-6, using a fixed delay value, referred to as the watchdog interval time (WI, FIG. 6) between the watchdog messages. If the station replies to one of the retry messages 152-2 to 152-6, then the watchdog function for that station is reset. If the number of retries (five retries are shown by way of example in FIG. 6) is exhausted, then the watchdog function will alert the NOS accordingly, that the station is no longer active in the system. The station will be logged-out as shown by line 154, that is, the station will be deleted from the list of active stations in the table 22 and the NOS will effect appropriate housekeeping measures, such as closing files which has been opened for that station.

As was mentioned hereinabove, the awake time for the awake timer 78 in the station 24 is chosen such that after each transmission by the station, a typically expected reply has time to arrive at the station. Also, the awake timer is reset after each receipt of a message, ensuring that the station 24 remains awake in case a series of reply messages is sent after transmission of a message by the station. Furthermore, it will be appreciated that the awake time (AT, FIG. 5A) is chosen to be smaller than the station idle time (IT, FIG. 6) to avoid the situation that a station 24 never enters the SLEEP state since it receives watchdog messages before the AWAKE-1 state is left.

Furthermore, the duration of sleep time, that is the time at which the sleep timer 80 (FIG. 3) expires (and the station 24 enters the AWAKE-2 state), should be chosen such that at least one watchdog message is received. Preferably, the series of watchdog messages should be nearing the end of its retry cycle, thereby providing a high ratio between the time spent in the SLEEP state and the time spent in the AWAKE state (i.e. AWAKE-1 plus AWAKE-2 time), resulting in increased power saving.

Thus:

sleep time>station idle time sleep time<station idle time+retry count*watchdog interval time In a typical example for a mobile station 24, power consumption of the wireless transceiver 60 in the AWAKE state is 1.5 watts and power consumption in the SLEEP state is 150 milliwatts. The awake time (AT) is five seconds, the sleep time (ST) is 60 minutes and the deadspot time (DT) is two minutes. Furthermore the station idle time (IT) is 20 minutes, the watchdog interval time (WI) is one minute and the watchdog retry count is 42. With these values, it has been found that the station power consumption is reduced by using the features described hereinabove from 1.5 watts. Typically values are: a reduction to 161 milliwatts for a station 24 located in a cell 28, but inactive; 194 milliwatts for a station 24 in a dead spot; and 285 milliwatts for a station located in a cell 28 and in infrequent communication (e.g. 10% activity).

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of operating a wireless local area network system having a mobile station, comprising the steps of:

monitoring transmission activity of the mobile station;

if no transmission activity of the mobile station is detected for a predetermined first time period, transmitting to the mobile station an inquiry message requesting a response message from the mobile station;

operating the mobile station in a low power mode for a second time period commencing after transmission activity occurs at the mobile station; and operating the mobile station in a high power mode for a third time period commencing prior to transmission of the inquiry message so as to enable receipt of the inquiry message by the mobile station.

2. The method of claim 1, further comprising the steps of:

maintaining at a server a record of whether the mobile station is active in the system; and updating the record in accordance with whether the response message was transmitted by the mobile station in response to the inquiry message.

3. The method of claim 1, further comprising the steps of:

transmitting a series of inquiry messages to the mobile station which are spaced apart in time at periodic intervals; and operating the mobile station in the high power mode prior to transmission of a last inquiry message of the series of inquiry messages.

4. The method of claim 1, further comprising the step of operating the mobile station in the high power mode for a predetermined fourth time period commencing immediately after transmission or receipt of any type of message by the mobile station.

5. The method of claim 1, further comprising the step of transmitting a response message from the mobile station in response to receipt of the inquiry message by the mobile station.

6. The method of claim 1, wherein the third time period is predetermined.

7. A local area network system, comprising:

a mobile station;

means for monitoring transmission activity of the mobile station;

means for transmitting an inquiry message requesting a response message from the mobile station if no transmission activity of the mobile station is detected for a predetermined first time period;

means for operating the mobile station in a low power mode for a second time period commencing after transmission activity occurs at the mobile station; and means for operating the mobile station in a high power mode for a third time period commencing prior to transmission of the inquiry message so as to enable receipt of the inquiry message by the mobile station.

8. The system of claim 7, further comprising a server wherein:

said server includes a table for maintaining a record of whether the mobile station is active in the system; and said server updates the table in accordance with whether the response message was transmitted by the mobile station in response to the inquiry message.

9. The system of claim 7, wherein the mobile station includes a transceiver circuit coupled to a power management circuit, and further wherein the power management circuit operates the transceiver circuit so that the mobile station operates in the low power mode for the second time period commencing after transmission activity occurs at the mobile station.

10. The system of claim 9, further wherein the power management circuit operates the transceiver circuit so that the mobile station operates in the high power mode for the third time period commencing prior to transmission of the inquiry message so as to enable receipt of the inquiry message by the mobile station.

11. The system of claim 9, wherein the mobile station further includes a sleep timer for controlling the duration of the time which the mobile station operates in the low power mode.

12. The system of claim 9, wherein the mobile station further includes an awake timer for enabling the mobile station to operate in the high power mode for a predetermined fourth time period immediately following transmission or receipt of any type of message.

13. The system of claim 9, wherein the mobile station further includes a deadspot timer for controlling the duration of time which the mobile station operates in the high power mode.

14. The system of claim 7, wherein the third time period is predetermined.

* * * * *